United States Patent
Iwasa et al.

(10) Patent No.: US 11,512,194 B2
(45) Date of Patent: Nov. 29, 2022

(54) THERMOPLASTIC RESIN COMPOSITION FOR WIRE-COATING AND HEAT RESISTANT WIRE

(71) Applicant: RIKEN TECHNOS CORPORATION, Tokyo-to (JP)

(72) Inventors: Kaoru Iwasa, Tokyo-to (JP); Shinichi Kishimoto, Tokyo-to (JP)

(73) Assignee: RIKEN TECHNOS CORPORATION, Tokyo-to (JP)

( * ) Notice: Subject to any disclaimer, the term of this patent is extended or adjusted under 35 U.S.C. 154(b) by 367 days.

(21) Appl. No.: 16/636,935

(22) PCT Filed: Aug. 8, 2017

(86) PCT No.: PCT/JP2017/028825
§ 371 (c)(1),
(2) Date: Feb. 6, 2020

(87) PCT Pub. No.: WO2019/030834
PCT Pub. Date: Feb. 14, 2019

(65) Prior Publication Data
US 2020/0369865 A1 Nov. 26, 2020

(51) Int. Cl.
| | |
|---|---|
| C08L 23/06 | (2006.01) |
| C08L 23/10 | (2006.01) |
| C08L 23/26 | (2006.01) |
| C08K 3/22 | (2006.01) |
| C08K 5/13 | (2006.01) |
| C08K 5/14 | (2006.01) |
| H01B 7/295 | (2006.01) |
| C08L 25/18 | (2006.01) |
| C08K 3/12 | (2006.01) |
| C08K 5/36 | (2006.01) |
| C08L 23/08 | (2006.01) |

(52) U.S. Cl.
CPC ............ *C08L 25/18* (2013.01); *C08K 3/12* (2013.01); *C08K 5/13* (2013.01); *C08K 5/14* (2013.01); *C08K 5/36* (2013.01); *C08L 23/0815* (2013.01); *C08L 23/10* (2013.01); *C08L 23/26* (2013.01); *C08L 2203/202* (2013.01)

(58) Field of Classification Search
CPC .......... C08L 23/04; C08L 23/06; C08L 23/08; C08L 23/0846; C08L 23/0869; C08L 23/0853; C08L 23/10; C08L 23/14; C08L 23/142; C08L 51/00; C08L 51/06; C08L 53/00; C08L 53/02; C08L 53/025; C08K 3/12

See application file for complete search history.

(56) References Cited

U.S. PATENT DOCUMENTS

| | | |
|---|---|---|
| 6,414,059 B1 | 7/2002 | Kobayashi et al. |
| 2014/0227518 A1 | 8/2014 | Kishimoto et al. |

FOREIGN PATENT DOCUMENTS

| | | | |
|---|---|---|---|
| CN | 1566189 | | 1/2005 |
| CN | 103890865 | | 6/2014 |
| CN | 104231396 A | * | 12/2014 |
| JP | 2000-143935 | | 5/2000 |
| JP | 2000-315424 | | 11/2000 |
| JP | 2001-316537 | | 11/2001 |
| JP | 2002-105255 | | 4/2002 |
| JP | 2002-241550 | | 8/2002 |
| JP | 2003-192846 | | 7/2003 |
| JP | 2005-179658 | | 7/2005 |
| JP | 2005-239997 | | 9/2005 |
| JP | 2007-211105 | | 8/2007 |
| JP | 2007-211106 | | 8/2007 |
| JP | 2008-202002 | | 9/2008 |
| JP | 2012-255077 | | 12/2012 |
| JP | 5431287 | | 12/2013 |

OTHER PUBLICATIONS

List of organic peroxides http://kr.ec21.com/co/c/chemex/upfile/2_4.pdf (Year: 2022).*
International Search Report (ISR) dated Oct. 31, 2017 in International (PCT) Application No. PCT/JP2017/028825.
Extended European Search Report dated Feb. 25, 2021 in corresponding European Patent Application No. 17921090.1.
Haruna, "Handbook of Polymer Additives", CMC Publishing Co., Ltd., Jul. 20, 2014, 1st edition 2nd printing, p. 9, p. 42-43, with partial English translation.
Office Action dated Mar. 26, 2020 in corresponding Japanese Patent Application No. 2016-084914; with English Translation.
Office Action dated Dec. 3, 2021 in Chinese Patent Application No. 201780093679.5, with English-language translation.
Office Action dated Jul. 28, 2020 in the corresponding Japanese Patent Application No. 2016-084914, with Machine Translation.
Examination Report dated Jan. 20, 2021 in corresponding Indian Patent Application No. 202017009490.

* cited by examiner

*Primary Examiner* — Irina S Zemel
*Assistant Examiner* — Jeffrey S Lenihan
(74) *Attorney, Agent, or Firm* — Wenderoth, Lind & Ponack, L.L.P.

(57) ABSTRACT

The invention provides a thermoplastic resin composition having (A) a thermoplastic polymer comprising (a1) 5 mass % to less than 50 mass % of a propylene polymer having a melting point of 150° C. or higher, (a2) 10 mass % to less than 60 mass % of an ethylene polymer, (a3) 5 mass % to less than 50 mass % of, for example, a hydrogenated product of a block copolymer of an aromatic vinyl compound and a conjugated diene compound, and (a4) 1 mass % to less than 30 mass % of, for example, an unsaturated carboxylic acid-modified olefin polymer; (B) a softener for nonaromatic rubbers; (C) a metal hydrate; (D) an organic peroxide; (E) an antioxidant; and (F) a coupling agent.

10 Claims, 1 Drawing Sheet

THERMOPLASTIC RESIN COMPOSITION FOR WIRE-COATING AND HEAT RESISTANT WIRE

BACKGROUND OF THE INVENTION

Field of the Invention

The present invention relates to a thermoplastic resin composition and a wire using the same. More specifically, the present invention relates to a thermoplastic resin composition having excellent fire resistance, flexibility, heat resistance, and gasoline resistance and that is suitable as a material for wire-coating, as well as a wire using the same as a coating material, in particular, a heat-resistant wire for vehicles.

Background Art

Wires used in vehicles, for example, a high-voltage wire for automobiles and a wire used for wiring in engine rooms are generally wires having excellent heat resistance at use rating temperature of 120° C. or 150° C., the so-called "heat-resistant wire", because the possible environment in which it will be used is severe. From the viewpoint of satisfying various characteristics required for a wire for vehicles such as heat resistance and fire resistance, such a wire for vehicles have been conventionally produced by using a thermoplastic material such as a resin composition having an unvulcanized rubber or an ethylene copolymer as a base resin to form the wire and then further subjecting the formed wire to a post-crosslinking treatment such as sulfur vulcanization, water crosslinking, organic peroxide crosslinking, and electron beam crosslinking.

However, there is has been a problem that the material cannot be recycled by the post-crosslinking treatment.

There is proposed as a material for wire-coating, "a resin composition having high strength and excellent abrasion resistance, and furthermore fire resistance which is obtainable by partially crosslinking a vinyl aromatic thermoplastic elastomer composition comprising a block copolymer such as a styrene-isoprene block copolymer and polypropylene as a base resin to which a softener for nonaromatic rubbers is added as a softener by using an organic peroxide via a metal hydrate subjected to silane surface treatment" (Patent Document 1). However, this technique cannot sufficiently satisfy the heat resistance, such as the heat deformation resistance and heat aging resistance as a coating material for a heat resistant wire for vehicles.

Also known as a material for wire-coating having good heat resistance is a resin composition comprising a thermoplastic resin such as an ethylene polymer, a halogen-free flame retardant such as a metal hydrate, and a silane coupling agent (for example, Patent Document 2). However, this technique cannot sufficiently satisfy the flexibility and gasoline resistance as a coating material for a heat-resistant wire for a vehicle. Further, the problem has not been solved that the material cannot be recycled, and a post-crosslinking treatment with warm water is additionally required after the coating and molding.

In order to solve the problem of gasoline resistance, there has been proposed the use of a silicone-based elastomer as the above-described thermoplastic resin. However, a new problem arises of high cost, and further the problem of flexibility and recyclability is still unsolved.

PRIOR ART DOCUMENT

Patent Document

Patent Document 1: JP 2000-315424 A
Patent Document 2: JP 2012-255077 A

SUMMARY OF THE INVENTION

Problem to be Solved by the Invention

The object of the present invention is to provide a thermoplastic resin composition having excellent fire resistance and flexibility, and good heat resistance and gasoline resistance without having to carry out a post-crosslinking treatment, as well as a wire using the same as a coating material, in particular, a heat-resistant wire for vehicles.

Means to Solve the Problem

As a result of intensive research, the present inventors have found that a specific thermoplastic resin composition can overcome the above-described problem.

That is, the present invention relates to a thermoplastic resin composition comprising: (A) a thermoplastic polymer, (B) a softener for nonaromatic rubbers, (C) a metal hydrate, (D) an organic peroxide, (E) an antioxidant, and (F) a coupling agent;

wherein the above-mentioned component (A) comprises:

(a1) 5 mass % to less than 50 mass % of a propylene polymer having a melting point of 150° C. or higher;

(a2) 10 mass % to less than 60 mass % of an ethylene polymer;

(a3) 5 mass % to less than 50 mass % of one or more selected from the group consisting of a block copolymer of an aromatic vinyl compound and a conjugated diene compound, a block copolymer of an aromatic vinyl compound and isobutylene, and a hydrogenated product of a block copolymer of an aromatic vinyl compound and a conjugated diene compound; and (a4) 1 mass % to less than 30 mass % of one or more selected from the group consisting of an unsaturated carboxylic acid-modified olefin polymer, an unsaturated carboxylic acid-modified aromatic vinyl compound elastomer, and an epoxy group-containing olefin polymer;

wherein the total of the above-described components (a1), (a2), (a3) and (a4) is 100 mass %; and the above-described component (E) is comprised in an amount of more than 1 part by mass and 15 parts by mass or less with respect to the total of 100 parts by mass of component (A) and component (B).

The second aspect of the present invention relates to the thermoplastic resin composition according to the first aspect of the present invention comprising:

70 to 95% by mass of the above-described component (A); and 30 to 5% by mass of the above-described component (B), with the total of component (A) and component (B) being 100 mass %, and based on the total of 100 parts by mass of component (A) and component (B), 30 to 150 parts by mass of the above-described component (C);

0.01 to 1.0 part by mass of the above-described component (D);

1 to 15 parts by mass of the above-described component (E); and 0.1 to 8 parts by mass of the above-described component (F).

The third aspect of the present invention relates to the thermoplastic resin composition according to the first and the second aspects of the present invention, wherein the above-described component (a2) comprises one or more selected from the group consisting of:

(a2-1) a copolymer of ethylene and an α-olefin having 4 to 10 carbon atoms, having a density of 860 to 935 Kg/m$^3$; and (a2-2) a polar ethylene copolymer.

The fourth aspect of the present invention relates to the thermoplastic resin composition according to any one of the first to the third aspects of the present invention, wherein the above-described component (E) comprises:

(E-1) a hindered phenol antioxidant; and (E-2) a thioether antioxidant.

The fifth aspect of the present invention relates to a wire comprising the thermoplastic resin composition according to any one of the first to the fourth aspects of the present invention.

The sixth aspect of the present invention is the wire according to the fifth aspect of the present invention which is for vehicles.

The seventh aspect of the present invention is a method for producing the wire according to the fifth or sixth aspect of the present invention, comprising:

(1) a step of melt-kneading (A) a thermoplastic polymer, (B) a softener for nonaromatic rubbers, (C) a metal hydrate, (D) an organic peroxide, (E) an antioxidant, (F) a coupling agent, and optional components to be used as desired at a temperature higher than or equal to the 1 minute half-life temperature of the above-described component (D) for 30 seconds to obtain the thermoplastic resin composition according to any one of the first to the fourth inventions; and (2) a step of forming a wire using the thermoplastic resin composition obtained in the above-described step (1), without (3) a step of post-crosslinking treatment.

The eighth aspect of the present invention is a method for producing a thermoplastic resin composition according to any one of the first to fourth aspects of the present invention, comprising any one of the steps selected from the group consisting of:

a step of introducing all of (A) a thermoplastic polymer, (B) a softener for nonaromatic rubbers, (C) a metal hydrate, (D) an organic peroxide, (E) an antioxidant, (F) a coupling agent, and optional components to be used as desired into a melt kneader and melt kneading the mixture for 30 seconds or longer at a temperature higher than or equal to the 1 minute half-life temperature of the above-described component (D) to obtain a thermoplastic resin composition;

a step of introducing all of the above-described components (A) to (D), (F) and optional components to be used as desired into a melt kneader and after the melt kneading temperature has reached a temperature higher than or equal to the 1 minute half-life temperature of the above-described component (D), introducing the above-described component (E) into the melt kneader to obtain a thermoplastic resin composition;

a step of firstly introducing all of the above-described components (A) to (D), (F), and the optional components to be used as desired, and a part of the above-described component (E) into a melt kneader and after the melt kneading temperature has reached a temperature higher than or equal to the 1 minute half-life temperature of the above-described component (D), introducing the remainder of the component (E) into the melt kneader to obtain a thermoplastic resin composition; and a step of firstly introducing all of the above-described component (D), at least a part of the above-described components (A) to (C), (F), and the optional components to be used as desired into a melt kneader, and after the melt kneading temperature has reached a temperature higher than or equal to the 1 minute half-life temperature of the above-described component (D), introducing the remainder of the above-described components (A) to (C), (F), and the optional components to be used as desired, and the above-described component (E) into the melt kneader to obtain a thermoplastic resin composition.

The ninth aspect of the present invention is a method for producing a wire, comprising:

(1) a step of obtaining a thermoplastic resin composition by the method of claim 8;

(2) a step of forming a wire using the thermoplastic resin composition obtained in the above-described step (1); without (3) a step of post-crosslinking treatment.

Effect of the Invention

The thermoplastic resin composition of the present invention has excellent fire resistance and flexibility, and has good heat resistance and gasoline resistance without a post-crosslinking treatment. Therefore, it can be suitably used as a coating material for a wire, in particular for a heat-resistant wire for vehicles.

MODE FOR CARRYING OUT THE INVENTION

The term "resin" is used herein as a term including a resin mixture containing two or more resins and also a resin composition containing a component other than a resin. The term "or higher" in relation to a numerical range is used to mean a certain numerical value equal to or higher than a certain numerical value. For example, 20% or higher means 20% or higher than 20%. The term "or less" in relation to a numerical range is used to mean a certain numerical value or less than a certain numerical value. For example, 20% or less means 20% or less than 20%. In addition, the symbol "~" in relation to a numerical range is used to mean a certain numerical value, a value higher than a certain numerical value and less than another certain numerical value, or another certain numerical value. The another certain numerical value is a numerical value larger than some numerical value. For example, 10~90% means 10%, higher than 10% and less than 90%, or 90%. Except in the examples or unless otherwise specified, all numerical values used herein and in the claims are to be understood as prefixed with the term "about". Without the intention of limiting the application of the doctrine of equivalents to the claims, each numerical value should be interpreted in the light of significant figures and by applying the usual rounding method.

1. Thermoplastic Resin Composition:

The thermoplastic resin composition comprises (A) a thermoplastic polymer, (B) a softener for nonaromatic rubbers, (C) a metal hydrate, (D) an organic peroxide, (E) an antioxidant, and (F) a coupling agent. Each component will be described below.

(A) Thermoplastic Polymer:

Component (A) is a thermoplastic polymer, receives components (B) to (F) and the optional components to be used as desired, and serves to improve mechanical properties.

Component (A) comprises:

(a1) 5 mass % to less than 50 mass % of a propylene polymer having a melting point (Tm) of 150° C. or higher;

(a2) 10 mass % to less than 60 mass % of an ethylene polymer;

(a3) 5 mass % to less than 50 mass % of one or more selected from the group consisting of a block copolymer of an aromatic vinyl compound and a conjugated diene compound, a block copolymer of an aromatic vinyl compound and isobutylene, and a hydrogenated product of a block copolymer of an aromatic vinyl compound and a conjugated diene compound; and (a4) 1 mass % to less than 30 mass % of one or more selected from the group consisting of an unsaturated carboxylic acid-modified olefin polymer, an unsaturated carboxylic acid-modified aromatic vinyl compound elastomer, and an epoxy group-containing olefin polymer;

wherein the total of the above-described components (a1), (a2), (a3) and (a4) is 100 mass %.

From the viewpoint of the balance between flexibility and mechanical properties, the compounding ratio of component (A) and component (B) is usually 70 to 95% by mass of component (A) (30 to 5% by mass of component (B)) and preferably 80 to 95% by mass of component (A) (20 to 5% by mass of component (B)), where the total of component (A) and component (B) is 100% by mass.

(a1) Propylene Polymer

Component (a1) is a propylene polymer having a melting point of 150° C. or higher. Component (a1) serves to improve heat deformation resistance and gasoline resistance.

Any propylene polymer can be used as component (a1) without limitation, as long as the melting point is 150° C. or higher. Examples of component (a1) include a propylene homopolymer and a copolymer of propylene and a small amount of another α-olefin (including a block copolymer and a random copolymer). One of these can be used as component (a1) or two or more of these as a mixture.

Examples of the α-olefin include ethylene, 1-butene, 1-hexene, 1-octene, 1-decane, 3-methyl-1-pentene, and 4-methyl-1-pentene. One or more of these can be used as the α-olefin.

In the present specification, the melting point is the peak top melting point on the highest temperature side of the second melting curve (a melting curve measured in the last temperature elevation process) measured by a program according to JIS K 7121-1987, in which by using Diamond DSC type differential scanning calorimeter from Perkin-Elmer Japan Inc., the temperature is held at 230° C. for 5 minutes, cooled to −10° C. at 10° C./min, held at −10° C. for 5 minutes, and heated to 230° C. at 10° C./min.

The melting point of component (a1) is 150° C. or higher and preferably 160° C. or higher from the viewpoint of heat deformation resistance. Although there is no upper limitation to the melting point, the most commonly available propylene polymer has the melting point of about 167° C.

The melt mass flow rate of component (a1) measured in accordance with JIS K 7210-1999 under the conditions of a temperature of 230° C. and a load of 21.18N is generally, without particular limitation, 0.1 to 100 g/10 min and preferably 0.3 to 30 g/10 min from the viewpoint of formability.

From the viewpoint of heat deformation resistance, the compounding ratio of component (a1) in component (A) is 5 mass % or more and preferably 10 mass % or more, where the total of components (a1), (a2), (a3), and (a4) is 100 mass %. On the other hand, from the viewpoint of flexibility and tensile elongation, the ratio is less than 50 mass % and preferably 35 mass % or less.

(a2) Ethylene Polymer:

Component (a2) is an ethylene polymer. Component (a2) serves to improve flexibility and tensile elongation.

Examples of component (a2) include high-density polyethylene, low-density polyethylene, linear low-density polyethylene, a plastomer on a copolymer of ethylene and α-olefin, an elastomer on a copolymer of ethylene and α-olefin, and a polar ethylene polymer. One of these can be used as component (a2) or two or more of these as a mixture.

Among these, component (a2) is preferably (a2-1) a copolymer (including a random copolymer and a block copolymer) obtained by polymerizing ethylene and an α-olefin having 4 to 10 carbon atoms by using a metallocene catalyst, having a density of 860 to 935 Kg/m$^3$ and preferably 870 to 920 Kg/m$^3$. As a result, improvement is seen in tensile strength, tensile elongation, and cold resistance.

Examples of the α-olefin having 4 to 10 carbon atoms include 1-butene, 1-hexene, 4-methyl-1-pentene, 1-octene, and 1-decane. Among these, from the viewpoint of tensile strength, tensile elongation and cold resistance, an α-olefin having 6 to 8 carbon atoms is preferable, and 1-hexene, 4-methyl-1-pentene, and 1-octene are more preferable. One or more of these can be used as the α-olefin having 4 to 10 carbon atoms.

Among these, component (a2) is preferably (a2-2) a polar ethylene copolymer. Improvement is seen in flame resistance, tensile strength, and tensile elongation. Component (a2-2), a polar ethylene copolymer, is a copolymer of ethylene and a polar group-containing monomer, and a derivative thereof.

Examples of the polar group-containing monomer include vinyl acetate; acrylic acid alkyl esters such as methyl acrylate, ethyl acrylate, and butyl acrylate; methacrylic acid alkyl esters such as methyl methacrylate, ethyl methacrylate, and butyl methacrylate; unsaturated carboxylic acids such as acrylic acid, methacrylic acid, maleic acid, itaconic acid, and fumaric acid; and derivatives of unsaturated carboxylic acids such as maleic anhydride, itaconic acid monoester, itaconic acid diester, itaconic acid anhydride, fumaric acid monoester, fumaric acid diester, and fumaric acid anhydride. One or more of these can be used as the polar group-containing monomer.

Examples of component (a2-2) include ethylene ionomer resins obtained by using metallic ions to crosslink in between the molecules of an ethylene-vinyl acetate copolymer (EVA), an ethylene-methyl methacrylate copolymer (EMMA), an ethylene-ethyl acrylate copolymer (EEA), an ethylene-methyl acrylate copolymer (EMA), an ethylene-acrylic acid copolymer (EAA), an ethylene-methacrylic acid copolymer (EMAA), and an ethylene-methacrylic acid copolymer. Among these, component (a2-2) is preferably an ethylene-vinyl acetate copolymer (EVA) and an ethylene-ethyl acrylate copolymer (EEA) from the viewpoint of fire resistance. One of these can be used as component (a2-2) or two or more of these as a mixture.

Components (a2-1) and (a2-2) may each be used alone or in a mixture of the two. When the total of components (a2-1)

and (a2-2) is 100 mass %, the components are preferably used in an amount in which the compounding ratio of component (a2-2) is 50 to 100 mass % (the compounding ratio of component (a2-1) is 50 to 0 mass %). As a result, improvement is seen in the balance between tensile elongation and tensile strength.

Although the content of the structural unit derived from ethylene in component (a2) depends on the kind and molecular structure (whether being linear or having a branched long chain) of the comonomer to be copolymerized with ethylene, the content may be preferably 50 mass % or more and more preferably 60 mass % or more from the viewpoint of tensile strength. On the other hand, from the viewpoint of tensile elongation, the content may be preferably 90 mass % or less and more preferably 85 mass % or less.

The melt mass flow rate of component (a2) measured in accordance with JIS K 7210-1999 under the conditions of a temperature of 190° C. and a load of 21.18N is preferably, without particular limitation, 0.05 g/10 min or more and more preferably 0.1 g/10 min or more from the viewpoint of formability. On the other hand, from the viewpoint of mechanical properties, it may be preferably 150 g/min or less and more preferably 30 g/10 min or less.

From the viewpoints of flexibility, tensile strength, and tensile elongation, the compounding ratio of component (a2) in component (A) is 10 mass % or more and preferably 20 mass % or more, with the total of components (a1), (a2), (a3), and (a4) being 100 mass %. On the other hand, from the viewpoint of heat deformation resistance, the ratio is less than 60 mass % and preferably 55 mass % or less.

(a3) Aromatic Vinyl Compound Block Copolymer and the Like:

Component (a3) is one or more selected from the group consisting of a block copolymer of an aromatic vinyl compound and a conjugated diene compound, a block copolymer of an aromatic vinyl compound and isobutylene, and a hydrogenated product of a block copolymer of an aromatic vinyl compound and a conjugated diene compound. Component (a3) serves to improve heat deformation resistance and flexibility.

The block copolymer of an aromatic vinyl compound and a conjugated diene compound is generally a block copolymer consisted of one or more of polymer block(s) A and preferably two or more, from the viewpoint of mechanical properties, which is mainly composed of an aromatic vinyl compound, and one or more polymer block(s) B which is mainly composed of a conjugated diene compound. Examples of the block copolymer may include block copolymers having structures such as A-B, A-B-A, B-A-B-A, and A-B-A-B-A.

The block copolymer of an aromatic vinyl compound and isobutylene is generally a block copolymer consisted of one or more of polymer block(s) A and preferably two or more, from the viewpoint of mechanical properties, which is mainly composed of an aromatic vinyl compound, and one or more polymer block(s) B mainly composed of isobutylene. Examples of the block copolymer may include block copolymers having structures such as A-B, A-B-A, B-A-B-A, and A-B-A-B-A.

The hydrogenated product of a block copolymer of an aromatic vinyl compound and a conjugated diene compound is a substance obtainable by adding hydrogen to the carbon-carbon double bond in the block copolymer of the aromatic vinyl compound and the conjugated diene compound to give a carbon-carbon single bond. The hydrogenation can be carried out by a known method, for example, by hydrogenating in an inert solvent using a hydrogenation catalyst.

From the viewpoint of heat aging resistance, the hydrogenation ratio of the hydrogenated product of the block copolymer of an aromatic vinyl compound and a conjugated diene compound (the ratio of the number of bonds that became carbon-carbon single bonds due to the hydrogenation to the number of carbon-carbon double bonds in the block copolymer of an aromatic vinyl compound and a conjugated diene compound before the hydrogenation) may be generally, without particular limitation, 50% or more, preferably 70% or more, and more preferably 90% or more.

The aromatic vinyl compound is a polymerizable monomer having a polymerizable carbon-carbon double bond and an aromatic ring. Examples of the aromatic vinyl compound include styrene, t-butylstyrene, α-methylstyrene, p-methylstyrene, divinylbenzene, 1,1-diphenylstyrene, N,N-diethyl-p-aminoethylstyrene, vinyltoluene, and p-tert-butylstyrene. Among these, styrene is preferable. One or more of these can be used as the aromatic vinyl compound.

The conjugated diene compound is a polymerizable monomer having a structure in which two carbon-carbon double bonds are bonded by one carbon-carbon single bond. Examples of the conjugated diene compound include 1,3-butadiene, isoprene(2-methyl-1,3 butadiene), 2,3-dimethyl-1,3-butadiene, and chloroprene(2-chloro-1,3-butadiene). Among these, 1,3-butadiene and isoprene are preferred. One or more of these can be used as the conjugated diene compound.

From the viewpoint of heat deformation resistance and flexibility, the content of the structural units derived from the aromatic vinyl compound in component (a3) may be, without particular limitation, preferably 5 to 50 mass % and more preferably 20 to 40 mass %.

The polymer block A is a polymer block consisted of only the aromatic vinyl compound or a copolymer block of the aromatic vinyl compound and the conjugated diene compound or isobutylene. In the case where the polymer block A is the copolymer block as above, the content of the structural units derived from the aromatic vinyl compound in the polymer block A may generally be, without particular limitation, 50 mass % or more, preferably 70 mass % or more, and more preferably 90 mass % or more from the viewpoint of heat resistance. The distribution of the structural units derived from the conjugated diene compound or isobutylene in the polymer block A is not particularly limited. When there are 2 or more polymer blocks A, they may have the same structure or different structures from one another.

The polymer block B is a polymer block consisted only of the conjugated diene compound or isobutylene, or a copolymer block composed of the aromatic vinyl compound and the conjugated diene compound or isobutylene. In the case where the polymer block B is the copolymer block as above, the content of the structural units derived from the conjugated diene compound or isobutylene in the polymer block B may generally be, without particular limitation, 50 mass % or more, preferably 70 mass % or more, and more preferably 90 mass % or more from the viewpoint of flexibility. The distribution of the structural units derived from the aromatic vinyl compound in the polymer block B is not particularly limited. The coupling mode between the conjugated diene compound or isobutylene and the conjugated diene compound (hereinafter can be referred to as a "microstructure") is not particularly limited. When there are two or more polymer blocks B, they may have the same structure or different structures from one another.

Examples of the block copolymer of an aromatic vinyl compound and a conjugated diene compound include a styrene butadiene styrene block copolymer (SBS) and a styrene isoprene styrene block copolymer (SIS). Examples of the block copolymer of an aromatic vinyl compound and isobutylene include a styrene isobutylene styrene copolymer (SIBS). Examples of the hydrogenated product of the block copolymer of an aromatic vinyl compound and a conjugated diene compound include styrene ethylene butene copolymer (SEB), styrene ethylene propylene copolymer (SEP), styrene ethylene butane styrene copolymer (SEBS), styrene ethylene propylene styrene copolymer (SEPS), and styrene ethylene ethylene propylene styrene copolymer (SEEPS). Preferred among these are styrene ethylene butane styrene copolymer (SEBS), styrene ethylene propylene styrene copolymer (SEPS), and styrene ethylene ethylene propylene styrene copolymer (SEEPS). One of these can be used as component (a3) or two or more of these as a mixture.

From the viewpoint of heat deformation resistance, the compounding ratio of component (a3) in component (A) is 5 mass % or more and preferably 15 mass % or more, where the total of components (a1), (a2), (a3), and (a4) is 100 mass %. On the other hand, from the viewpoint of gasoline resistance and the appearance of the molded article, the ratio is less than 50 mass % and preferably 40 mass % or less.

(a4) Unsaturated Carboxylic Acid-Modified Olefin Polymer, Unsaturated Carboxylic Acid-Modified Aromatic Vinyl Compound Elastomer, and Epoxy Group-Containing Olefin Polymer:

Component (a4) is one or more selected from the group consisting of an unsaturated carboxylic acid-modified olefin polymer, an unsaturated carboxylic acid-modified aromatic vinyl compound elastomer, and an epoxy group-containing olefin polymer. Component (a4) plays an important function in compatibilization between component (A) and component (C).

The unsaturated carboxylic acid-modified olefin polymer is a substance obtained by modifying an olefin polymer using 1 or more selected from the group consisting of an unsaturated carboxylic acid and an unsaturated carboxylic acid derivative (graft polymerization of an unsaturated carboxylic acid or the like onto an olefin polymer).

The olefin polymer is a polymer or copolymer of an $\alpha$-olefin, or a copolymer of an $\alpha$-olefin and a monomer copolymerizable with the $\alpha$-olefin, which is mainly formed of structural units derived from an $\alpha$-olefin (generally 50 mass % or more, preferably 70 mass % or more, and more preferably 90 mass % or more).

Examples of the $\alpha$-olefin include ethylene, propylene, 1-butene, 1-hexene, 1-octene, 1-decane, 3-methyl-1-pentene, and 4-methyl-1-pentene. One or more of these can be used as the $\alpha$-olefin.

Examples of the monomers copolymerizable with the $\alpha$-olefin include vinyl acetates; acrylic acid alkyl esters such as methyl acrylate, ethyl acrylate, and butyl acrylate; methacrylic acid alkyl esters such as methyl methacrylate, ethyl methacrylate, and butyl methacrylate; unsaturated carboxylic acids such as acrylic acid, methacrylic acid, maleic acid, itaconic acid, and fumaric acid; and derivatives of unsaturated carboxylic acids such as maleic anhydride, itaconic acid monoester, itaconic acid diester, itaconic acid anhydride, fumaric acid monoester, fumaric acid diester, and fumaric acid anhydride; and nonconjugated dienes such as 1,4-hexadiene, 5-methyl-1,5-hexadiene, 1,4-octadiene, cyclohexadiene, cyclooctadiene, dicyclopentadiene, 5-methylene-2-norbornene, 5-ethylidene-2-norbornene, 5-butilidene-2-norbornene, and 5-isopropenyl-2-norbornene. One or more of these can be used as the monomer copolymerizable with the $\alpha$-olefin.

Examples of the olefin polymer include linear low-density polyethylene (LLDPE), low-density polyethylene (LDPE), very low-density polyethylene (VLDPE), medium-density polyethylene (MDPE), high-density polyethylene (HDPE), an ethylene $\alpha$-olefin copolymer (including a random copolymer and a block copolymer), polypropylene, a propylene $\alpha$-olefin copolymer (including a random copolymer and a block copolymer), polybutene, polypentene, an ethylene vinyl acetate copolymer (EVA), and an ethylene acrylic acid alkyl ester copolymer. One or more of these can be used as the olefin polymer.

Examples of the unsaturated carboxylic acid include maleic acid, itaconic acid, fumaric acid, acrylic acid and methacrylic acid. Examples of the derivatives of the unsaturated carboxylic acid include maleic acid monoester, maleic acid diester, maleic anhydride, itaconic acid monoester, itaconic acid diester, itaconic anhydride, fumaric acid monoester, fumaric acid diester, fumaric acid anhydride, acrylic acid alkyl esters such as methyl acrylate, and methacrylic acid alkyl esters such as methyl methacrylate. Among these, maleic anhydride, acrylic acid and methacrylic acid are preferable from the viewpoint of compatibility. One or more of these can be used for modifying the olefin polymer.

In the present specification, the substance obtained by modifying component (a2-2), a polar ethylene copolymer (a copolymer of ethylene and a polar group-containing monomer such as an unsaturated carboxylic acid, and a derivative thereof) using one or more selected from the group consisting of an unsaturated carboxylic acid and an unsaturated carboxylic acid derivative gives component (a4). Component (a2-2) has a structural unit derived from an unsaturated carboxylic acid or a derivative thereof usually present only in the main chain. On the other hand, the substance obtained by modifying component (a2-2) using an unsaturated carboxylic acid or the like has a significant amount of the structural units derived from the unsaturated carboxylic acid or the like being grafted. As used herein, the expression "present only in the main chain" can be described in other words as "the structural units derived from an unsaturated carboxylic acid or the like in which the amount of those grafted is insignificant". In the field of resin compositions, a significant amount of grafted amount is usually 0.1% by mass or more, and therefore, the expression "present only in the main chain" can be further described in other words as "the structural units derived from an unsaturated carboxylic acid or the like, in which the amount of those grafted is usually less than 0.1% by mass and typically 0.01% by mass or less".

From the viewpoint of compatibility, preferred as the unsaturated carboxylic acid modified olefin polymer among these are maleic anhydride modified polyethylene, maleic anhydride modified ethylene $\alpha$-olefin copolymer, acrylic acid modified polyethylene, acrylic acid modified ethylene-$\alpha$-olefin copolymer, methacrylic acid modified polyethylene, and methacrylic acid modified ethylene $\alpha$-olefin copolymer.

The unsaturated carboxylic acid-modified aromatic vinyl compound elastomer is a substance obtained by modifying an aromatic vinyl compound elastomer using one or more selected from the group consisting of an unsaturated carboxylic acid and an unsaturated carboxylic acid derivative (graft polymerization of an unsaturated carboxylic acid or the like onto an aromatic vinyl compound elastomer).

Examples of the above aromatic vinyl compound elastomer include block copolymers of an aromatic vinyl compound and a conjugated diene compound such as a styrene butadiene styrene block copolymer (SBS) and a styrene isoprene styrene block copolymer (SIS); a hydrogenation product of block copolymers of an aromatic vinyl compound and conjugated diene compound such as a styrene ethylene butene copolymer (SEB), a styrene ethylene propylene copolymer (SEP), a styrene ethylene butene styrene copolymer (SEBS), a styrene ethylene propylene styrene copolymer (SEPS), and a styrene ethylene ethylene propylene styrene copolymer (SEEPS); a block copolymer of an aromatic vinyl compound and isobutylene such as a styrene isobutylene styrene copolymer (SIBS); a random copolymer of an aromatic vinyl compound and isobutylene such as a styrene butadiene random copolymer (SBR); and a hydrogenation product of a random copolymer of an aromatic vinyl compound and a conjugated diene compound such as a hydrogenated styrene butadiene random copolymer (HSBR). One or more of these can be used as the aromatic vinyl compound elastomer.

The unsaturated carboxylic acids and unsaturated carboxylic acid derivatives have been described above. Among these, maleic anhydride, acrylic acid and methacrylic acid are preferable from the viewpoint of compatibility. One or more of these can be used as the unsaturated carboxylic acid or the like to obtain the above-mentioned unsaturated carboxylic acid-modified aromatic vinyl compound elastomer.

From the view point of compatibility, the unsaturated carboxylic acid-modified aromatic vinyl compound elastomer is preferably a maleic anhydride-modified styrene ethylene butane styrene copolymer, a maleic anhydride-modified styrene ethylene propylene styrene copolymer, an acrylic acid-modified styrene ethylene butane styrene copolymer, an acrylic acid-modified styrene ethylene propylene styrene copolymer, a methacrylic acid-modified styrene ethylene butane styrene copolymer, and a methacrylic acid-modified styrene ethylene propylene styrene copolymer.

The epoxy group-containing olefin polymer is an olefin polymer containing structural units such as glycidyl ester, glycidyl ether, and glycidyl amine, derived from a polymerizable monomer containing epoxy groups such as glycidyl methacrylate, glycidyl acrylate, 4-hydroxybutyl metacrylate glycidyl ether, and 4-hydroxybutyl acrylate glycidyl ether.

The epoxy group-containing olefin polymer is, without limitation, usually a substance obtained by modifying an olefin polymer (by graft polymerization of a polymerizable monomer containing an epoxy group to an olefin polymer) using one or more polymerizable monomers containing an epoxy group. The epoxy group-containing olefin polymer may be a copolymer with an α-olefin that is copolymerizable with an epoxy group-containing polymerizable monomer.

As for the olefin polymer used for modifying the one or more polymerizable monomer containing an epoxy group, mention can be made to those mentioned above as the olefin polymer used for obtaining the unsaturated carboxylic acid-modified olefin polymer. One or more of these can be used as the olefin polymer used for modifying the one or more polymerizable monomer containing an epoxy group.

As for component (a4), any one of an unsaturated carboxylic acid-modified olefin polymer, an unsaturated carboxylic acid-modified aromatic compound elastomer, or an epoxy group-containing olefin polymer may be used, and any two or more may be used in combination.

Among these, as for component (a4), an unsaturated carboxylic acid-modified olefin polymer is preferable from the viewpoint of compatibility between component (A) and component (C) and heat deformation resistance.

From the viewpoint of compatibility, tensile strength, and heat resistance, the compounding ratio of component (a4) in component (A) is 1 mass % or more and preferably 3 mass % or more, where the total of components (a1), (a2), (a3), and (a4) being 100 mass %. On the other hand, from the viewpoint of tensile elongation and formability, the ratio is less than 30 mass % and preferably 20 mass % or less.

(B) Softener for Nonaromatic Rubbers

Component (B) is a softener for nonaromatic rubbers. Component (B) plays an important role in flexibility.

Component (B) is a mineral oil of nonaromatic series (a hydrocarbon compound derived from petroleum or the like) or a synthetic oil (a synthetic hydrocarbon compound) and is usually in a liquid state or gel or gum state at room temperature. The term "nonaromatic series" as used herein means that the mineral oil is not classified as aromatic series in the following categories (aromatic carbon number is less than 30%). As for the synthetic oils, it means that no aromatic monomers are used.

The mineral oils used as the softener for rubbers are mixtures of any combination of one or more of paraffin chains, naphthene rings, and aromatic rings, where those having the number of naphthene ring carbon atoms from 30% to 45% are called the naphthene series, those having the number of aromatic carbon atoms of 30% or more are called the aromatic series, and those that do not belong to the naphthene or the aromatic series and have the number of paraffin chain carbon atoms of 50% or more of the total number of carbon atoms are called the paraffin series.

Examples of component (B) include paraffinic mineral oils such as linear saturated hydrocarbons, branched saturated hydrocarbons, and derivatives thereof; naphthenic mineral oils; and synthetic oils such as hydrogenated polyisobutylene, polyisobutylene, and polybutene. Examples of the commercial component (B) include isoparaffinic hydrocarbon oil from NOF Co., Ltd., "NA Solvent (product name)", n-paraffinic process oil from Idemitsu Kosan Co., Ltd., "DIANA PROCESS OIL PW-90 (product name)" and "DIANA PROCESS OIL PW-380 (product name)", synthetic isoparaffinic hydrocarbon from Idemitsu Petrochemical Co., Ltd., "IP-Solvent 2835 (product name)", and n-paraffinic process oil from Sanko Chemical Co., Ltd., "Neothiosol (product name)". Among these, from the viewpoint of compatibility, a paraffinic mineral oil is preferable and a paraffinic mineral oil having a small number of aromatic carbons is more preferable. Further, from the viewpoint of handling, those in a liquid state are preferred at room temperature. One of these can be used as component (B), or two more of these in combination.

From the viewpoint of heat resistance and handling, component (B) has a dynamic viscosity of preferably 20 to 1000 cSt at 37.8° C. as measured in accordance with JIS K2283-2000. From the viewpoint of handling, the flow point measured according to JIS K2269-1987 is preferably −10 to −25° C. Further from the viewpoint of safety, the flash point (COC) measured according to JIS K2265-2007 is preferably 170 to 300° C.

From the viewpoint of the balance between flexibility and mechanical properties, the compounding amount of component (B) is preferably 5 to 30 mass % and more preferably 5 to 20 mass %, where the total of component (A) and component (B) is 100 mass %.

(C) Metal Hydrate:

Component (C) is a metal hydrate. Component (C) has crystal water in the molecule, and releases the crystal water when combusted and serves to enhance fire resistance.

Examples of component (C) include compounds having a hydroxyl group or crystal water such as aluminum hydroxide, magnesium hydroxide, hydrated aluminum silicate, hydrated magnesium silicate, basic magnesium carbonate, and hydrotalcite. The compound may be surface-treated using any surface treatment agent such as a silane compound (a silane coupling agent), fatty acid, and phosphate ester, or the compound may be untreated for the surface. Among these, aluminum hydroxide and magnesium hydroxide are preferable as for component (C) from the viewpoint of fire resistance. One of these can be used as component (C), or two more of these in a combination.

From the viewpoint of fire resistance, the compounding amount of component (C) is preferably 30 parts by mass or more and more preferably 40 parts by mass or more, with respect to the total of 100 parts by mass of component (A) and component (B). On the other hand, the amount is preferably 150 parts by mass or less and more preferably 130 parts by mass or less from the viewpoint of flexibility, mechanical properties, and heat aging resistance.

(D) Organic Peroxide:

Component (D) is an organic peroxide. Component (D) generates radicals during melt kneading, causes the radicals to react in a chain reaction to modify component (A), and serves to improve heat deformation resistance.

Examples of the organic peroxide include dicumyl peroxide, di-t-butyl peroxide, 2,5-dimethyl-2,5-di-(t-butylperoxy)hexane, 2,5-dimethyl-2,5-di(t-butylperoxy)hexyne-3,1, 3-bis (t-butylperoxyisopropyl)benzene, 1,1-bis (t-butylperoxy)-3,3,5-trimethylcyclohexane, n-butyl-4,4-bis (t-butylperoxy) valerate, benzoyl peroxide, p-chlorobenzoyl peroxide, 2,4-dichlorobenzoyl peroxide, t-butylperoxybenzoate, t-butylperoxy isopropyl carbonate, diacetyl peroxide, lauroyl peroxide, and t-butyl cumyl peroxide. One of these can be used as component (D), or two more of these in combination.

As component (D), 2,5-dimethyl-2,5-di-(t-butylperoxy) hexane and dicumyl peroxide are preferable from the viewpoints of odor, coloring and scorch safety of the composition.

Examples of commercially available products of component (D) include "PERHEXA 25B (product name)" and "PERCUMYL D (product name)" from NOF Corporation.

From the viewpoint of heat deformation resistance, the compounding amount of component (D) is preferably 0.01 part by mass or more and more preferably 0.03 part by mass or more, with respect to the total of 100 parts by mass of component (A) and component (B). On the other hand, from the viewpoint of tensile elongation and appearance of the molded article, the amount is preferably 1.0 part by mass or less and preferably 0.5 part by mass or less.

(E) Antioxidant:

Component (E) is an antioxidant. Component (E) serves to improve heat aging resistance.

Examples of component (E) include antioxidants of types of hindered phenol (E-1), thioether (E-2), phosphite and amine.

Examples of the above-mentioned (E-1) hindered phenol antioxidants include triethylene glycol-bis3-(3-t-butyl-5-methyl-4-hydroxyphenyl)propionate, 1,6-hexanediol-bis3-(3,5-di-t-butyl-4-hydroxyphenyl) propionate, 2,4-bis-(n-octylthio)-6-4-hydroxy-3,5-di-t-butylanilino)-1,3,5-triazine, pentaerythrityl-tetrakis3-(3,5-di-t-butyl-4-hydroxyphenyl) propionate, 2,2-thio-diethylenebis3-(3,5-di-t-butyl-4-hydroxyphenyl)propionate, octadecyl-3-(3,5-di-t-butyl-4-hydroxyphenyl)propionate, 2,2-thiobis(4-methyl-6-t-butylphenol), N,N'-hexamethylenebis (3,5-di-t-butyl-4-hydroxy-hydroxycinnamide), 3,5-di-t-butyl-4-hydroxy-benzylphosphate-diethylester, and 1,3,5-trimethyl-2,4,6-tris (3,5-di-t-butyl-4-hydroxybenzyl)benzene.

Examples of the (E-2) thioether antioxidant include pentaerythritol tetrakis(3-dodecylthiopropionate), didodecylthiodipropionate, ditridecyl thiodipropionate, ditetradecylthiodipropionate, dioctadecylthiodipropionate, and 2-mercaptobenzimidazole.

Examples of the amine antioxidant include a polymer of 4,4'-dioctyl diphenylamine, N,N'-diphenyl-p-phenylenediamine, and 2,2,4-trimethyl-1,2-dihydroquinoline.

Examples of the phosphite antioxidant include diphenyldecylphosphite, triphenylphosphite, tris-(2,4-di-t-butylphenyl)phosphite, and tris-(2-ethylhexyl) phosphite.

One of these can be used as component (E), or two more of these in combination.

As component (E), it is preferable to use the (E-1) hindered phenol antioxidant and the (E-2) thioether antioxidant in combination. As a result, heat aging resistance can be remarkably improved.

From the viewpoint of heat aging resistance, the compounding amount of component (E) is more than 1 part by mass and preferably 3 parts by mass or more, with respect to the total of 100 parts by mass of component (A) and component (B). On the other hand, although there is no particular upper limit to the compounding amount of component (E), the amount of component (E) is usually 15 parts by mass or less and preferably 10 parts by mass or less.

(F) Coupling Agent:

Component (F) is a coupling agent. Component (F) functions as a compatibilizer between component (A) and component (C), and is effective in heat resistance.

Examples of component (F) include a silane coupling agent, a titanate coupling agent, and an acrylic acid coupling agent.

The silane coupling agent is a silane compound having at least two different reactive groups such as hydrolyzable groups (for example, alkoxy groups such as a methoxy group and an ethoxy group; acyloxy groups such as an acetoxy group; and halogen groups such as a chloro group) and organic functional groups (for example, an amino group, a vinyl group, an epoxy group, a methacryloxy group, an acryloxy group, an isocyanate group, and the like).

Examples of the silane coupling agent include a vinyl silane coupling agent (a silane compound having a vinyl group and a hydrolyzable group), a methacrylic silane coupling agent (a silane compound having a methacryloxy group and a hydrolyzable group), an acrylic silane coupling agent (a silane compound having an acryloxy group and a hydrolyzable group), an epoxy silane coupling agent (a silane compound having an epoxy group and a hydrolyzable group), an amino silane coupling agent (a silane compound having an amino group and a hydrolyzable group), and a mercapto silane coupling agent (a silane compound having a mercapto group and a hydrolyzable group).

Examples of the vinyl silane coupling agent include vinyltrimethoxysilane, vinyltriethoxysilane, vinyltris (βmethoxyethoxy) silane, vinyltriacetoxysilane, vinyl-tris (n-butoxy)silane, vinyl-tris (n-pentoxy)silane, vinyl-tris(n-hexoxy)silane, vinyl-tris(n-heptoxy) silane, vinyl-tris(n-octoxy)silane, vinyl-tris(n-dodecyloxo)silane, vinyl-bis(n-butoxy)methylsilane, vinyl-bis(n-pentoxy)methylsilane, vinyl-bis(n-pentoxy)methylsilane, vinyl-bis(n-hexoxy)methylsilane, vinyl-(n-butoxy)dimethylsilane, and vinyl-(n-pentoxy)dimethylsilane.

Examples of the methacrylic silane coupling agent include 3-methacryloxypropylmethyldimethoxysilane, 3-methacryloxypropyltrimethoxysilane, 3-methacryloxypropylmethyldiethoxysilane, and 3-methacryloxypropyltriethoxysilane.

Examples of the acrylic silane coupling agent include 3-acryloxypropyltrimethoxysilane.

Examples of the epoxy silane coupling agent include 2-(3,4-epoxycyclohexyl)ethyltrimethoxysilane, 3-glycidoxypropylmethyldimethoxysilane, 3-glycidoxypropyltrimethoxysilane, and 3-glycidoxypropylmethyldiethoxysilane.

Examples of the amino silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane.

Examples of the mercapto silane coupling agent include 3-mercaptopropylmethyldimethoxysilane and 3-mercaptopropyltrimethoxysilane.

Examples of the titanate coupling agent include monoalkoxy types having isopropoxy groups, chelate types having oxyacetic acid residues or ethylene glycol residues, and coordinating types in which phosphorous acid ester is added to tetraalkyl titanate.

Examples of the titanate coupling agents of monoalkoxytypes include isopropyltriisostearoyl titanate, isopropyltridodecylbenzene sulphonyltitanate, isopropyltri(dioctyl phosphate)titanate, isopropyltris(dioctyl pyrophosphate) titanate, and isopropyltri(N-aminoethyl-aminoethyl)titanate.

Examples of the titanate coupling agents of chelate types include bis(dioctyl pyrophosphate)oxyacetate titanate and bis(dioctyl pyrophosphate)ethylene titanate.

Examples of the titanate coupling agents of coordinating types include tetraoctylbis(ditridecyl phosphite)titanate and tetra(2,2-diallyloxymethyl-1-butyl)bis(ditridecyl)phosphite titanate.

One or more of these components can be used as component (F). Amongst these, a silane coupling agent is preferable as component (F) from the viewpoint of heat deformation resistance, and a vinyl silane coupling agent and a methacrylic silane coupling agent are more preferable from the viewpoint of heat deformation resistance.

From the viewpoint of sufficiently exhibiting the function as a compatibilizer for components (A) and (C), and from the viewpoint of heat deformation resistance, the compounding amount of component (F) is preferably 0.1 part by mass or more and more preferably 0.5 part by mass or more, with respect to the total of 100 parts by mass of component (A) and component (B). On the other hand, from the viewpoint of formability, the amount may be preferably 8 parts by mass or less and preferably 5 parts by mass or less.

The thermoplastic resin composition of the present invention preferably comprises (A) a thermoplastic polymer, (B) a softener for nonaromatic rubbers, (C) a metal hydrate, (D) an organic peroxide, (E) an antioxidant, and (F) a coupling agent; and does not contain a silanol condensation catalyst.

As used herein, the phrase "does not contain a silanol condensation catalyst" means" does not contain a silanol condensation catalyst intentionally" or "does not contain a silanol condensation catalyst in an amount useful for performing a post-crosslinking treatment with warm water, that is, the so-called water crosslinking treatment". The compounding amount of a silanol condensation catalyst useful for water crosslinking treatment is usually 0.1 part by mass or more with respect to the total of 100 parts by mass of component (A) and component (B), and therefore, the phrase "does not contain a silanol condensation catalyst" can be described in other words as "the content of the silanol condensation catalyst is usually less than 0.1 part by mass and typically 0.01 part by mass or less, with respect to 100 parts by mass of the total of component (A) and component (B)."

Examples of the silanol condensation catalyst include dibutyl tin dilaurate, dibutyl tin diacetate, dibutyl tin dioleate, stannous acetate, lead naphthenate, cobalt naphthenate, zinc caprylate, ferric 2-ethylhexanoate, titanic acid ester, tetrabutyl titanate ester, tetranonyl titanate ester, bis(acetylacetonitrile) a di-isopropyltitanium-ethylamine complex, a hexylamine complex, a dibutylamine complex, and a pyridine complex.

The thermoplastic composition of the present invention may optionally contain as far as the purpose of the present invention is not interfered, a heat stabilizer, a light stabilizer, a metal supplement, an ultraviolet absorber, a nucleating agent, a blocking inhibitor, a sealability modifier, a demolding agent (e.g., stearic acid, calcium stearate, and silicone oil), a lubricant such as a polyethylene wax, a colorant, a pigment, an inorganic filler (e.g., alumina, talc, calcium carbonate, mica, wollastonite, and clay), a foaming agent (including organic and inorganic types), a crosslinking auxiliary, and a flame retardant other than a metal hydrate, and the like.

When the thermoplastic resin composition of the present invention is used as a material for directly coating a conductor, it is preferable to further incorporate a metal scavenger. Examples of the metal scavenger include dodecane diacid bis[N2-(2-hydroxybenzoyl)hydrazide] and N,N'-bis[3-(3,5-di-t-butyl-4-hydroxyphenyl)propionyl] hydrazine.

By using any melt kneaders, the thermoplastic resin composition of the present invention can be obtained by introducing components (A) to (F) and optional components to be used as desired into the melt kneader simultaneously or in any order and then performing melt kneading of the mixture.

From the viewpoint of ensuring component (D) to function, the melt kneading is preferably carried out at a temperature higher than or equal to the 1 minute half-life temperature of component (D) for 30 seconds or longer and more preferably for 1 minute or longer at a temperature higher than or equal to the 1 minute half-life temperature of component (D). The 1 minute half-life temperature is a temperature at which the half-life becomes 1 minute, and when the —O—O— bond in component (D) is decomposed at this temperature, the time required for the current concentration of the bond to become half of the initial concentration is 1 minute.

From the viewpoint of ensuring component (D) to function, it is preferable that all or a part of component (E) is introduced into the melt kneader after the melt kneading temperature has reached a temperature higher than or equal to the 1 minute half-life temperature of component (D). Note that, the melt kneading temperature means the temperature of the resin composition which is melt-kneaded.

Examples of the method include:

a method in which firstly all of components (A) to (D), (F), and optional components to be used as desired are introduced into a melt kneader, and component (E) is introduced into the melt kneader after the melt kneading temperature has reached the 1 minute half-life temperature of component (D) and preferably after 30 seconds has elapsed after the temperature reach;

a method in which firstly components (A) to (D), (F), the optional components to be used as desired, and a part of component (E) are introduced into a melt kneader, and the rest of component (E) is introduced into the melt kneader after the melt kneading temperature has reached the 1 minute half-life temperature of component (D) and preferably after 30 seconds has elapsed after the temperature reach; and a method in which firstly all of component (D) and a part of components (A) to (C), (F), and the optional components to be used as desired are introduced into a melt kneader, and the rest of components (A) to (C), (F), and the optional components to be used as desired, and component (E) are introduced into the melt kneader after the melt kneading temperature has reached the 1 minute half-life temperature of component (D) and preferably after 30 seconds has elapsed after the temperature reach.

Examples of the melt kneader include a batch kneader such as a pressure kneader or a mixer; an extrusion kneader such as a single screw extruder, a twin screw extruder rotating in the same direction, and a twin screw extruder rotating in different directions; and a calendar roll kneader. Any of these may be used in a combination.

The resulting composition can be pelletized by any method and then formed into any article by any method. The pelletization can be carried out by a method such as hot cutting, strand cutting, and under water cutting.

2. Wire:

The wire of the present invention is a wire containing the thermoplastic resin composition of the present invention. The wire of the present invention is preferably a wire for vehicles used for a high-voltage wire of automobiles and wiring in engine rooms, and the like, and is used as an insulating coating material or a sheath material in which the thermoplastic resin composition of the present invention directly covers the conductor.

The method of producing the wire of the present invention is not particularly limited. The method may include, for example, a method comprising: (1) a step of melt-kneading at a temperature higher than or equal to the 1 minute half-life temperature of component (D) for 30 seconds or longer to obtain the thermoplastic resin composition according to the present invention; and (2) a step of forming a wire using the thermoplastic resin composition obtained in step (1), without (3) a step of post-crosslinking treatment.

The method for obtaining the thermoplastic resin composition of the present invention in step (1) has been described above.

In step (2), there is no particular limitation to the method of forming a wire using the thermoplastic resin composition of the present invention. An example of the above method includes a method in which coating is carried out by melting the thermoplastic resin composition of the present invention and extruding the same around a given conductor or a twisted product formed of several insulating coating conductors by using a cable molding apparatus provided with a given extruder and a given die.

Examples of the post-crosslinking treatment in step (3) include sulfur vulcanization, water crosslinking, organic peroxide crosslinking, and electron beam crosslinking.

The meaning of "without (3) a step of post-crosslinking treatment" will be explained in the case of water crosslinking. In the case of water crosslinking, the phrase "without (3) a step of post-crosslinking treatment" means "the step is excluded of immersing the thermoplastic resin composition in warm water at a temperature of 50 to 90° C. for 5 to 48 hours, the thermoplastic resin composition used being one formed by incorporating a silanol condensation catalyst in an amount useful for water crosslinking". It is not intended to exclude all steps in which water is used, such as the step in which a thermoplastic resin composition is melted and extruded around a conductor and the like, followed by cooling with the use of water for at most several minutes so that the coating material is solidified. The same applies to the other post-crosslinking treatments.

EXAMPLES

Hereinafter, the present invention will be described with reference to the Examples; however the present invention is not limited thereby.

Measurement Method (1) Hardness:

According to JIS K 7215-1986, a 6 mm thick press sheet was used as a test specimen, and a value was measured of durometer hardness (Type A) of 15 seconds. The hardness may be preferably 95 or less and more preferably 60 to 90. The 6 mm thick press sheet was produced by heat pressing with the condition of preheating the sheet at a preheating temperature of 220° C. for 2 minutes and then pressurizing the sheet at a temperature of 220° C. for 2 minutes.

Figure 2:
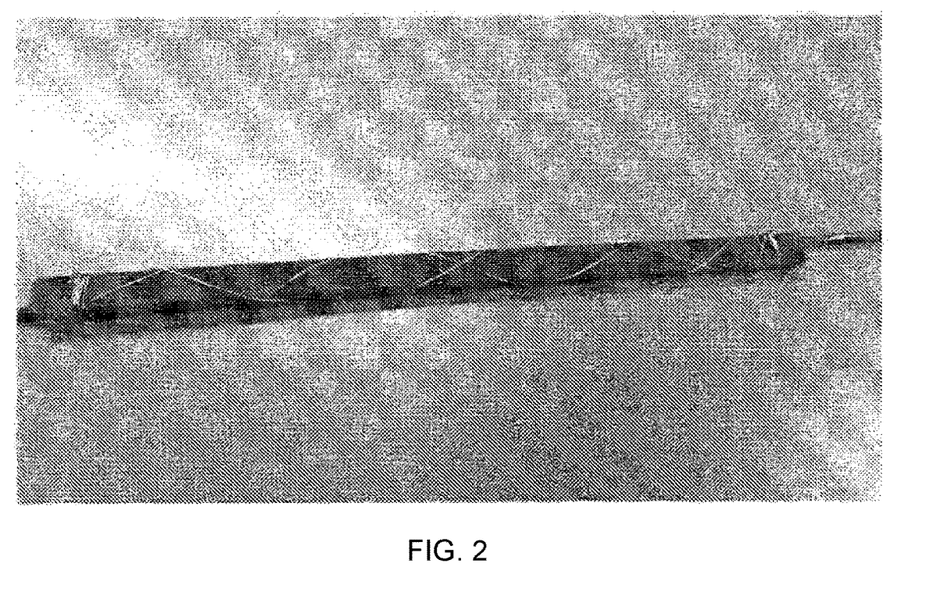
FIG. 2 shows a test specimen for a fire resistant test.

(2) Tensile Test:

Tensile strength was measured at a tensile speed of 200 mm/min in accordance with JIS K 7127:1999. As a test specimen, a test specimen type 5 was used, which was punched out from an extruded tape having a thickness of 1 mm using an apparatus equipped with an extruder of φ20 mm and a 1 mm-thick flat die under the condition in which the die outlet temperature was 210° C. (FIG. 2 in the above standard). Tensile strength may be preferably 10.3 MPa or more and more preferably 12 MPa or more. Tensile elongation may be preferably 150% or more and more preferably 250% or more.

(3) Heat Aging Resistance:

A test specimen obtained in the same manner as in the (2) tensile test was treated in a gear oven at 190° C. for a certain period of time, and then tensile elongation was measured in the same manner as in the (2) tensile test. The results were plotted with the processing time on the horizontal axis and the tensile elongation on the vertical axis, and the processing time at which the tensile elongation became 100% was obtained by interpolation. The heat aging resistance may be preferably 180 hours or longer and more preferably 200 hours or longer. The test specimens were prepared for each processing time.

(4) Copper Damage Resistance:

Two rectangular sheets having a length of 16 cm and a width of 4 cm were taken from a 1 mm-thick press sheet, a bare copper tape having a thickness of 0.1 mm, a length of 16 cm and a width of 3 cm was sandwiched between the sheets, and the sheets were hot-pressed under the condition in which the temperature was 220° C., the preheating time was 2 minutes, and the pressurizing time was 2 minutes to prepare a test specimen. The 1 mm-thick press sheet was produced by heat pressing under the condition in which preheating of the sheet was done at a preheating temperature of 220° C. for 2 minutes and then pressurizing of the sheet was done at a temperature of 220° C. for 2 minutes. After the test specimen obtained above was treated in a gear oven at 175° C. for a certain period of time, the test specimen was bent by hand while being pressed against a corner of a triangle pole having an angle of 20°, and visual observation was repeated whether a crack is generated on the outer side of the bent portion of the test specimen to determine the time (day) until a crack started to form in the test specimen. The copper damage resistance may be preferably 8 days or more and more preferably 20 days or more. The test specimens were prepared for each processing time.

(5) Heat Deformation Resistance:

In accordance with JIS C 3005-2014, a test specimen having a width of 15 mm and a length of 30 mm punched out from an extruded tape obtained in the same manner as the above (2) tensile test was used to measure the heating deformation rate under the condition in which the temperature was 150° C. and the load was 1 kg. The heating deformation rate may be preferably 25% or less, more preferably 20% or less, and further preferably 15% or less.

Figure 1:
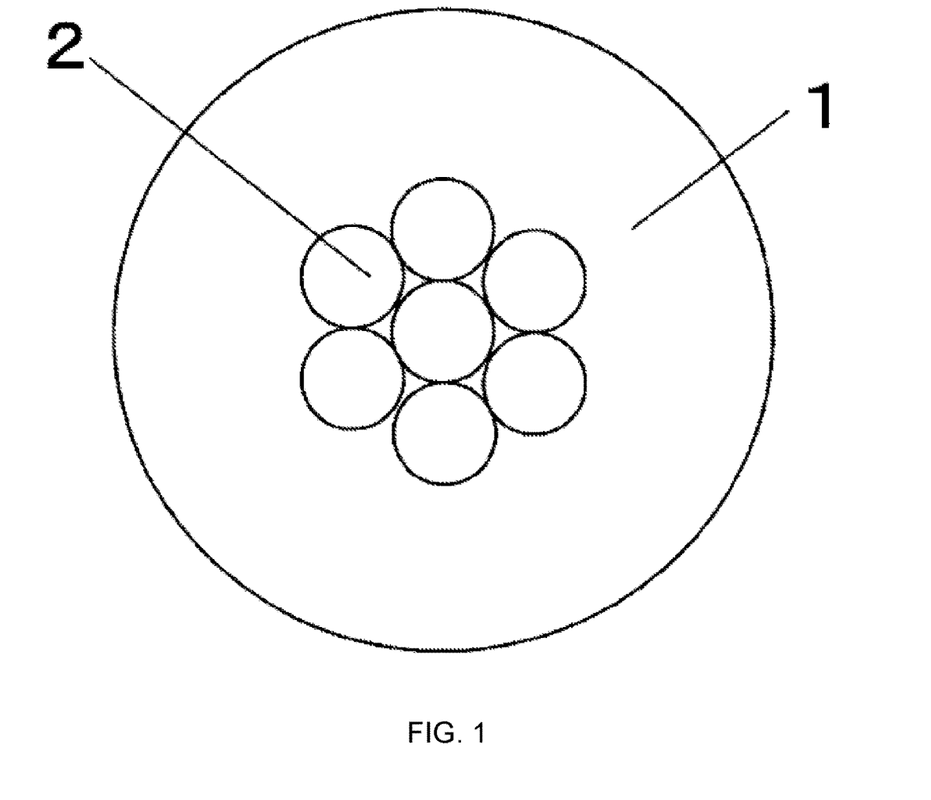
FIG. 1 is a conceptual diagram of a cross-sectional shape showing one example of the heat resistant wire for vehicles according to the present invention.

(6) Flame Retardancy:

A strip having a width of 6.5 mm and a length of 150 mm was punched out from a 1 mm-thick press sheet, and the strip was fixed to a steel wire (brass, 2 mm diameter) using a wire having a diameter of 0.1 mm to prepare a test specimen (FIG. 1). Referring to JIS C 3005:2014, 4.26 Flame Retardancy, a) Horizontal Test, a horizontal fire resistant test was carried out in such a way that the flame was brought into contact with the central position of the face opposite to the side of which the strip with the steel wire was present. Evaluation was based on the following criteria. The 1 mm-thick press sheet was produced by heat pressing under the condition in which the sheet was preheated at a preheating temperature of 220° C. for 2 minutes and then pressurized at a temperature of 220° C. for 2 minutes.

◎: The sample did not catch fire.

○: The sample caught fire and then the flame was extinguished within 60 seconds.

×: The sample caught fire and combustion continued for 60 seconds or longer.

(7) Gasoline Resistance:

A donut-shaped test specimen having an outer diameter of 22 mm and an inner diameter of 8 mm punched out from a 1 mm thick press sheet was immersed in gasoline at a temperature of 23° C. for 20 hours, and subsequently, the volume change rate was measured. The volume change rate as gasoline resistance is preferably 30% or less and more preferably 20% or less. The conditions for producing the 1 mm-thick press sheet are the same as those of the (6) fire resistance test.

Raw Materials Used (a1) A propylene polymer having a melting point of 150° C. or higher:

(a1-1) block copolymer of propylene and ethylene from Sun Allomer, Ltd., "VB170A (product name)", having a melting point of 165° C. and a melt mass flow rate of 0.5 g/10 min; and (a1-2) block copolymer of propylene and ethylene from Japan Polypropylene Corporation, "EC 9 (product name)", having a melting point of 161° C. and a melt mass flow rate of 0.5 g/10 min.

(a1') Reference propylene polymer:

(a1'-1) random copolymer of propylene and ethylene from Sun Allomer, Ltd., "PB222A (product name)", having a melting point of 146° C. and a melt mass flow rate of 0.8 g/10 min.

(a2) Ethylene polymer:

(a2-1-1) low-density polyethylene formed by polymerization using a metallocene catalyst from Japan Polyethylene Corporation, "KS240T (product name)", having a density of 880 Kg/m$^3$, a melt mass flow rate of 2.2 g/10 min, and a content of structural units derived from ethylene of 77 mass %; and (a2-2-1) ethylene-vinyl acetate copolymer of Ube-Maruzen Polyethlene Co., Ltd., "VF120T (product name)", having a density of 940 Kg/m$^3$, a melt mass flow rate of 1.0 g/10 min, and a content of structural units derived from ethylene of 80 mass %.

(a3) Hydrogenated product of a block copolymer of aromatic vinyl compound and conjugated diene compound:

(a3-1) styrene ethylene ethylene propylene styrene copolymer (SEEPS) from Kuraray Co., Ltd., "SEPTON 4077 (product name)", containing 30 mass % of structural units derived from styrene; and (a3-2) styrene ethylene butene styrene copolymer (SEBS) from Asahi Kasei Chemicals Corporation, "Toughtec N504 (product name)", containing 30 mass % of structural units derived from styrene.

(a4) Unsaturated carboxylic acid modified olefin polymer and the like:

(a4-1) maleic anhydride modified ethylene α-olefin copolymer from Mitsui Chemicals, Inc., "Admer XE 070 (product name)", having a density of 893 Kg/m$^3$ and a melt mass flow rate of 3.0 g/10 min (190° C., 21.18 N);

(a4-2) maleic anhydride modified styrene ethylene butene styrene copolymer from Asahi Kasei Chemicals Corporation, "Toughtec M1913 (product name)"; and (a4-3) ethylene-glycidyl methacrylate copolymer from Sumitomo Chemical Co., Ltd., "Bond Fast BF-E (product name)", having a melt mass flow rate of 3.0 g/10 min (190° C., 21.18 N).

(B) Softener for nonaromatic rubbers:

(B-1) paraffin oil from Idemitsu Kosan Co., Ltd., "Diana process oil PW-90 (product name)", having a paraffin component of 71 mass % and a naphthene component of 29 mass %.

(C) Metal hydrate:

(C-1) synthetic magnesium hydroxide without surface treatment from Albemarle Japan Corporation, "Magnifin H-7 (product name)".

(D) Organic peroxide:

(D-1) 2,5-dimethyl-2,5-di(t-butylperoxy)hexane from NOF Co., Ltd., "Perhexa 25B (product name)", having a 1 min half-life temperature of 179° C.

(E) Antioxidant:

(E-1-1) hindered phenolic antioxidant, pentaerythrityltetrakis 3-(3,5-di-t-butyl-4-hydroxyphenyl)propionate, from BASF Corporation, "IRGANOX 1010 (product name)"; and (E-2-1) thioether antioxidant, pentaerythritol tetrakis(3-dodecylthiopropionate) from Shipro Kasei Kaisha, Ltd., "SEENOX412S (product name)".

(F) Coupling agent:

(F-1) silane coupling agent, 3-methacryloxypropyltrimethoxysilane from Dow Corning Co., "OFS-6030 (product name)".

(G) Metal scavenger:

(G-1) dodecane diacid bis[N2-(2-hydroxybenzoyl)hydrazide] from ADEKA Corporation, "Adekastab CDA-6 (product name)"; and (G-2) N,N'-bis[3-(3,5-di-t-butyl-4-hydroxyphenyl)propionyl] hydrazine from ADEKA Corporation, "Adekastab CDA-10 (product name)".

Examples 1 to 42

Thermoplastic resin compositions were produced by melt-kneading the resin compositions formed of the formulation (parts by mass) as shown in any one of Tables 1 to 6 under the condition in which the die outlet resin temperature was 230° C., using a twin screw extruder. The above tests (1) to (7) were conducted. The results are shown in any one of Tables 1 to 6. All the raw materials were collectively fed from a feed port near the base of the screw of the twin screw extruder.

Example 2-2

A thermoplastic resin composition was produced by melt-kneading the resin composition of the formulation (parts by mass) as shown in Table 1 using a twin screw extruder under the condition in which the die outlet resin temperature was 230° C. The above tests (1) to (7) were conducted. The results are shown in Table 1. Note that, components (E-1-1) and (E-2-1) were side-fed from a feed port in the intermediate portion of the screw of the twin screw extruder, and the other raw materials were collectively fed from a feed port near the base of the screw. The melt kneading temperature at the side feed position was 204° C.

TABLE 1

|  |  | Ex. 1 | Ex. 2 | Ex. 2-2 | Ex. 3 | Ex. 4 | Ex. 5 | Ex. 6 | Ex. 7 |
|---|---|---|---|---|---|---|---|---|---|
| Formulation (parts by weight) | a1-1 | 3 | 8 | 8 | 25 | 42 | 52 | | |
|  | a1-2 | | | | | | | 25 | |
|  | a1'-1 | | | | | | | | 25 |
|  | a2-1-1 | 13 | 8 | 8 | 6 | 5 | 5 | 6 | 6 |
|  | a2-2-1 | 27 | 27 | 27 | 19 | 16 | 15 | 19 | 19 |
|  | a3-1 | 35 | 35 | 35 | 30 | 20 | 15 | 30 | 30 |
|  | a3-2 | | | | | | | | |
|  | a4-1 | 12 | 12 | 12 | 10 | 7 | 3 | 10 | 10 |
|  | a4-2 | | | | | | | | |
|  | a4-3 | | | | | | | | |
|  | B-1 | 10 | 10 | 10 | 10 | 10 | 10 | 10 | 10 |
|  | C-1 | 60 | 60 | 60 | 60 | 60 | 60 | 60 | 60 |
|  | D-1 | 0.3 | 0.3 | 0.3 | 0.3 | 0.3 | 0.3 | 0.3 | 0.3 |
|  | E-1-1 | 4 | 4 | 4 | 4 | 4 | 4 | 4 | 4 |
|  | E-2-1 | 1 | 1 | 1 | 1 | 1 | 1 | 1 | 1 |
|  | F-1 | 2 | 2 | 2 | 2 | 2 | 2 | 2 | 2 |
|  | G-1 | 1 | 1 | 1 | 1 | 1 | 1 | 1 | 1 |
|  | G-2 | 1 | 1 | 1 | 1 | 1 | 1 | 1 | 1 |
| Evaluation results | Hardness | 81 | 84 | 85 | 89 | 93 | 96 | 89 | 87 |
|  | Tensile strength (MPa) | 16.2 | 16.0 | 16.3 | 15.9 | 14.2 | 13.6 | 15.1 | 14.6 |
|  | Tensile elongation (%) | 330 | 350 | 345 | 305 | 180 | 110 | 285 | 275 |
|  | Heat aging resistance (hr) | 245 | 240 | 245 | 230 | 215 | 205 | 230 | 230 |
|  | Copper damage resistance (day) | 23 | 23 | 23 | 23 | 21 | 19 | 22 | 23 |
|  | Heat deformation rate (%) | 29 | 23 | 15 | 10 | 9 | 6 | 12 | 30 |
|  | Fire resistance | ○ | ○ | ○ | ○ | ○ | ○ | ○ | ○ |
|  | Gasoline resistance (%) | 26 | 23 | 18 | 19 | 12 | 10 | 20 | 18 |

TABLE 2

|  |  | Ex. 8 | Ex. 9 | Ex. 10 | Ex. 11 | Ex. 12 | Ex. 13 | Ex. 14 |
|---|---|---|---|---|---|---|---|---|
| Formulation (parts by weight) | a1-1 | 35 | 33 | 17 | 15 | 25 | 25 | 30 |
|  | a1-2 | | | | | | | |
|  | a1'-1 | | | | | | | |
|  | a2-1-1 | 2 | 4 | 14 | 20 | 19 | 0 | 9 |
|  | a2-2-1 | 5 | 12 | 40 | 42 | 6 | 25 | 31 |
|  | a3-1 | 28 | 25 | 20 | 15 | 30 | 30 | 3 |
|  | a3-2 | | | | | | | |
|  | a4-1 | 10 | 6 | 4 | 3 | 10 | 10 | 17 |
|  | a4-2 | | | | | | | |
|  | a4-3 | | | | | | | |
|  | B-1 | 10 | 10 | 10 | 10 | 10 | 10 | 10 |
|  | C-1 | 60 | 60 | 60 | 60 | 60 | 60 | 60 |
|  | D-1 | 0.3 | 0.3 | 0.3 | 0.3 | 0.3 | 0.3 | 0.3 |
|  | E-1-1 | 4 | 4 | 4 | 4 | 4 | 4 | 4 |
|  | E-2-1 | 1 | 1 | 1 | 1 | 1 | 1 | 1 |
|  | F-1 | 2 | 2 | 2 | 2 | 2 | 2 | 2 |
|  | G-1 | 1 | 1 | 1 | 1 | 1 | 1 | 1 |
|  | G-2 | 1 | 1 | 1 | 1 | 1 | 1 | 1 |

TABLE 2-continued

|  |  | Ex. 8 | Ex. 9 | Ex. 10 | Ex. 11 | Ex. 12 | Ex. 13 | Ex. 14 |
|---|---|---|---|---|---|---|---|---|
| Evaluation results | Hardness | 96 | 93 | 90 | 89 | 88 | 91 | 93 |
|  | Tensile strength (MPa) | 10.0 | 10.5 | 16.2 | 16.8 | 17.1 | 14.5 | 16.2 |
|  | Tensile elongation (%) | 130 | 190 | 320 | 340 | 245 | 320 | 200 |
|  | Heat aging resistance (hr) | 215 | 220 | 235 | 235 | 230 | 225 | 210 |
|  | Copper damage resistance (day) | 21 | 22 | 23 | 22 | 22 | 22 | 23 |
|  | Heat deformation rate (%) | 10 | 12 | 23 | 28 | 10 | 10 | 32 |
|  | Fire resistance | ◯ | ◯ | ◯ | ◯ | ◯ | ◯ | ◯ |
|  | Gasoline resistance (%) | 10 | 12 | 16 | 17 | 19 | 17 | 5 |

TABLE 3

|  |  | Ex. 15 | Ex. 16 | Ex. 17 | Ex. 18 | Ex. 19 | Ex. 20 | Ex. 21 |
|---|---|---|---|---|---|---|---|---|
| Formulation (parts by weight) | a1-1 | 30 | 18 | 10 | 25 | 25 | 25 | 20 |
|  | a1-2 |  |  |  |  |  |  |  |
|  | a1'-1 |  |  |  |  |  |  |  |
|  | a2-1-1 | 10 | 5 | 5 | 6 | 7 | 7 | 5 |
|  | a2-2-1 | 25 | 16 | 15 | 19 | 23 | 21 | 16 |
|  | a3-1 | 12 | 43 | 52 |  | 30 | 30 | 24 |
|  | a3-2 |  |  |  | 30 |  |  |  |
|  | a4-1 | 15 | 8 | 8 | 10 | 0 | 2 | 25 |
|  | a4-2 |  |  |  |  |  |  |  |
|  | a4-3 |  |  |  |  |  |  |  |
|  | B-1 | 10 | 10 | 10 | 10 | 10 | 10 | 10 |
|  | C-1 | 60 | 60 | 60 | 60 | 60 | 60 | 60 |
|  | D-1 | 0.3 | 0.3 | 0.3 | 0.3 | 0.3 | 0.3 | 0.3 |
|  | E-1-1 | 4 | 4 | 4 | 4 | 4 | 4 | 4 |
|  | E-2-1 | 1 | 1 | 1 | 1 | 1 | 1 | 1 |
|  | F-1 | 2 | 2 | 2 | 2 | 2 | 2 | 2 |
|  | G-1 | 1 | 1 | 1 | 1 | 1 | 1 | 1 |
|  | G-2 | 1 | 1 | 1 | 1 | 1 | 1 | 1 |
| Evaluation results | Hardness | 90 | 87 | 85 | 89 | 87 | 87 | 87 |
|  | Tensile strength (MPa) | 16.0 | 13.4 | 13.1 | 15.0 | 9.9 | 11.2 | 15.9 |
|  | Tensile elongation (%) | 230 | 300 | 220 | 280 | 340 | 320 | 180 |
|  | Heat aging resistance (hr) | 210 | 230 | 230 | 210 | 210 | 215 | 230 |
|  | Copper damage resistance (day) | 22 | 23 | 22 | 23 | 21 | 21 | 23 |
|  | Heat deformation rate (%) | 24 | 10 | 8 | 13 | 28 | 24 | 12 |
|  | Fire resistance | ◯ | ◯ | ◯ | ◯ | ◯ | ◯ | ◯ |
|  | Gasoline resistance (%) | 11 | 27 | 35 | 20 | 17 | 16 | 15 |

TABLE 4

|  |  | Ex. 22 | Ex. 23 | Ex. 24 | Ex. 25 | Ex. 26 | Ex. 27 | Ex. 28 |
|---|---|---|---|---|---|---|---|---|
| Formulation (parts by weight) | a1-1 | 20 | 25 | 25 | 30 | 20 | 15 | 25 |
|  | a1-2 |  |  |  |  |  |  |  |
|  | a1'-1 |  |  |  |  |  |  |  |
|  | a2-1-1 | 5 | 6 | 6 | 6 | 5 | 5 | 6 |
|  | a2-2-1 | 15 | 19 | 19 | 21 | 15 | 15 | 19 |
|  | a3-1 | 20 | 30 | 30 | 30 | 30 | 25 | 30 |
|  | a3-2 |  |  |  |  |  |  |  |
|  | a4-1 | 35 |  |  | 10 | 8 | 8 | 10 |
|  | a4-2 |  | 10 |  |  |  |  |  |
|  | a4-3 |  |  | 10 |  |  |  |  |
|  | B-1 | 5 | 10 | 10 | 3 | 22 | 32 | 10 |
|  | C-1 | 60 | 60 | 60 | 60 | 60 | 60 | 20 |
|  | D-1 | 0.3 | 0.3 | 0.3 | 0.3 | 0.3 | 0.3 | 0.3 |

TABLE 4-continued

|  |  | Ex. 22 | Ex. 23 | Ex. 24 | Ex. 25 | Ex. 26 | Ex. 27 | Ex. 28 |
|---|---|---|---|---|---|---|---|---|
|  | E-1-1 | 4 | 4 | 4 | 4 | 4 | 4 | 4 |
|  | E-2-1 | 1 | 1 | 1 | 1 | 1 | 1 | 1 |
|  | F-1 | 2 | 2 | 2 | 2 | 2 | 2 | 2 |
|  | G-1 | 1 | 1 | 1 | 1 | 1 | 1 | 1 |
|  | G-2 | 1 | 1 | 1 | 1 | 1 | 1 | 1 |
| Evaluation results | Hardness | 89 | 91 | 89 | 96 | 80 | 74 | 84 |
|  | Tensile strength (MPa) | 16.2 | 13.5 | 11.5 | 17.1 | 11.6 | 7.5 | 17.9 |
|  | Tensile elongation (%) | 140 | 295 | 260 | 245 | 280 | 290 | 365 |
|  | Heat aging resistance (hr) | 230 | 225 | 220 | 230 | 225 | 230 | 255 |
|  | Copper damage resistance (day) | 23 | 22 | 23 | 23 | 22 | 23 | 25 |
|  | Heat deformation rate (%) | 10 | 21 | 22 | 8 | 23 | 36 | 18 |
|  | Fire resistance | ○ | ○ | ○ | ○ | ○ | ○ | ○ |
|  | Gasoline resistance (%) | 13 | 20 | 19 | 23 | 12 | 8 | 22 |

TABLE 5

|  |  | Ex. 29 | Ex. 30 | Ex. 31 | Ex. 32 | Ex. 33 | Ex. 34 | Ex. 35 |
|---|---|---|---|---|---|---|---|---|
| Formulation (parts by weight) | a1-1 | 25 | 25 | 25 | 25 | 25 | 25 | 25 |
|  | a1-2 |  |  |  |  |  |  |  |
|  | a1'-1 |  |  |  |  |  |  |  |
|  | a2-1-1 | 6 | 6 | 6 | 6 | 6 | 6 | 6 |
|  | a2-2-1 | 19 | 19 | 19 | 19 | 19 | 19 | 19 |
|  | a3-1 | 30 | 30 | 30 | 30 | 30 | 30 | 30 |
|  | a3-2 |  |  |  |  |  |  |  |
|  | a4-1 | 10 | 10 | 10 | 10 | 10 | 10 | 10 |
|  | a4-2 |  |  |  |  |  |  |  |
|  | a4-3 |  |  |  |  |  |  |  |
|  | B-1 | 10 | 10 | 10 | 10 | 10 | 10 | 10 |
|  | C-1 | 35 | 140 | 180 | 60 | 60 | 60 | 60 |
|  | D-1 | 0.3 | 0.3 | 0.3 |  | 0.02 | 0.8 | 1.5 |
|  | E-1-1 | 4 | 4 | 4 | 4 | 4 | 4 | 4 |
|  | E-2-1 | 1 | 1 | 1 | 1 | 1 | 1 | 1 |
|  | F-1 | 2 | 2 | 2 | 2 | 2 | 2 | 2 |
|  | G-1 | 1 | 1 | 1 | 1 | 1 | 1 | 1 |
|  | G-2 | 1 | 1 | 1 | 1 | 1 | 1 | 1 |
| Evalutaion results | Hardness | 85 | 95 | 96 | 89 | 89 | 89 | 89 |
|  | Tensile strength (MPa) | 17.0 | 11.8 | 9.1 | 14.9 | 15.1 | 15.8 | 14.5 |
|  | Tensile elongation (%) | 355 | 190 | 135 | 360 | 330 | 180 | 95 |
|  | Heat aging resistance (hr) | 245 | 185 | 160 | 225 | 230 | 230 | 225 |
|  | Copper damage resistance (day) | 24 | 23 | 21 | 23 | 23 | 24 | 23 |
|  | Heat deformation rate (%) | 16 | 7 | 5 | 30 | 24 | 9 | 7 |
|  | Fire resistance | ○ | ◎ | ◎ | ○ | ○ | ○ | ○ |
|  | Gasoline resistance (%) | 20 | 16 | 14 | 23 | 20 | 17 | 15 |

TABLE 6

|  |  | Ex. 36 | Ex. 37 | Ex. 38 | Ex. 39 | Ex. 40 | Ex. 41 | Ex. 42 |
|---|---|---|---|---|---|---|---|---|
| Formulation (parts by weight) | a1-1 | 25 | 25 | 25 | 25 | 25 | 25 | 25 |
|  | a1-2 |  |  |  |  |  |  |  |
|  | a1'-1 |  |  |  |  |  |  |  |
|  | a2-1-1 | 6 | 6 | 6 | 6 | 6 | 6 | 6 |
|  | a2-2-1 | 19 | 19 | 19 | 19 | 19 | 19 | 19 |
|  | a3-1 | 30 | 30 | 30 | 30 | 30 | 30 | 30 |
|  | a3-2 |  |  |  |  |  |  |  |
|  | a4-1 | 10 | 10 | 10 | 10 | 10 | 10 | 10 |

TABLE 6-continued

|  |  | Ex. 36 | Ex. 37 | Ex. 38 | Ex. 39 | Ex. 40 | Ex. 41 | Ex. 42 |
|---|---|---|---|---|---|---|---|---|
|  | a4-2 |  |  |  |  |  |  |  |
|  | a4-3 |  |  |  |  |  |  |  |
|  | B-1 | 10 | 10 | 10 | 10 | 10 | 10 | 10 |
|  | C-1 | 60 | 60 | 60 | 60 | 60 | 60 | 60 |
|  | D-1 | 0.3 | 0.3 | 0.3 | 0.3 | 0.3 | 0.3 | 0.3 |
|  | E-1-1 | 0.5 | 1.5 | 6 | 6 | 4 | 4 | 4 |
|  | E-2-1 |  | 1 | 2 |  | 1 | 1 | 1 |
|  | F-1 | 2 | 2 | 2 | 2 |  | 0.3 | 2 |
|  | G-1 | 1 | 1 | 1 | 1 | 1 | 1 |  |
|  | G-2 | 1 | 1 | 1 | 1 | 1 |  | 1 |
| Evaluation results | Hardness | 89 | 89 | 89 | 89 | 89 | 89 | 89 |
|  | Tensile strength (MPa) | 15.4 | 15.5 | 15.5 | 15.5 | 13.2 | 14.0 | 16.0 |
|  | Tensile elongation (%) | 300 | 295 | 295 | 300 | 360 | 350 | 310 |
|  | Heat aging resistance (hr) | 145 | 185 | 255 | 190 | 220 | 225 | 220 |
|  | Copper damage resistance (day) | 23 | 23 | 23 | 21 | 23 | 24 | 8 |
|  | Heat deformation rate (%) | 12 | 13 | 13 | 12 | 26 | 22 | 10 |
|  | Fire resistance | ○ | ○ | ○ | ○ | ○ | ○ | ○ |
|  | Gasoline resistance (%) | 19 | 19 | 19 | 19 | 21 | 20 | 19 |

The thermoplastic resin composition of the present invention is excellent in fire resistance and flexibility and has good tensile strength, tensile elongation, heat aging resistance, heat deformation resistance, and gasoline resistance without a post-crosslinking treatment with warm water. It is also excellent in copper damage resistance. Therefore, it can be suitably used as a coating material for a wire, in particular, for a heat-resistant wire for vehicles. Furthermore, it can be expected to be suitably used as a coating material for a heat resistant wire for vehicles in ISO 6722 Class D.

DESCRIPTION OF REFERENCE SYMBOLS

1: insulating coating comprising the thermoplastic resin composition of the present invention
2: conductor of 7 strands

The invention claimed is:

1. A thermoplastic resin composition comprising, (A) a thermoplastic polymer, (B) a softener for nonaromatic rubbers, (C) a metal hydrate, (D) an organic peroxide, (E) an antioxidant, and (F) a coupling agent,
   wherein said component (A) comprises:
   (a1) 5 mass % to less than 50 mass % of a propylene polymer having a melting point of 150° C. or higher;
   (a2) 10 mass % to less than 60 mass % of an ethylene polymer;
   (a3) 5 mass % to less than 50 mass % of one or more selected from the group consisting of a block copolymer of an aromatic vinyl compound and a conjugated diene compound, a block copolymer of an aromatic vinyl compound and isobutylene, and a hydrogenated product of a block copolymer of an aromatic vinyl compound and a conjugated diene compound; and
   (a4) 1 mass % to less than 30 mass % of one or more selected from the group consisting of an unsaturated carboxylic acid-modified olefin polymer, an unsaturated carboxylic acid-modified aromatic vinyl compound elastomer, and an epoxy group-containing olefin polymer; and
   a total of said components (a1), (a2), (a3) and (a4) is 100 mass %,
   wherein said component (a2) comprises:
   (a2-1) a copolymer of ethylene and an α-olefin having 4 to 10 carbon atoms, having a density of 860 to 935 Kg/m$^3$; and
   (a2-2) a polar ethylene copolymer,
   wherein said thermoplastic resin composition comprises:
   70 to 95% by mass of said component (A); and
   30 to 5% by mass of said component (B), with a total of said component (A) and said component (B) being 100 mass %, and based on the total of 100 parts by mass of said component (A) and said component (B),
   30 to 150 parts by mass of said component (C);
   0.01 to 1.0 part by mass of said component (D);
   more than 1 part by mass and 15 parts by mass or less of said component (E); and
   0.1 to 8 parts by mass of said component (F), and
   wherein a volume change rate as gasoline resistance is 30% or less, wherein the volume change rate represents a volume change rate after a donut-shaped test specimen having an outer diameter of 22 mm and an inner diameter of 8 mm punched out from a 1 mm thick press sheet of the thermoplastic resin composition is immersed in gasoline at a temperature of 23° C. for 20 hour.

2. The thermoplastic resin composition according to claim 1, wherein said component (E) comprises:
   (E-1) a hindered phenol antioxidant; and
   (E-2) a thioether antioxidant.

3. A wire comprising the thermoplastic resin composition according to claim 1.

4. The wire according to claim 3 for vehicles.

5. A method for producing the wire according to claim 3, comprising:
   (1) a step of melt-kneading (A) a thermoplastic polymer, (B) a softener for nonaromatic rubbers, (C) a metal hydrate, (D) an organic peroxide, (E) an antioxidant, (F) a coupling agent, and optional components to be used as desired at a temperature higher than or equal to the 1 minute half-life temperature of said component (D) for 30 seconds or longer to obtain the thermoplastic resin composition; and
   (2) a step of melting the thermoplastic resin composition and extruding the thermoplastic resin composition around a conductor or a twisted product formed of several insulating coating conductors to form a wire using the thermoplastic resin composition obtained in said step (1), without (3) a step of post-crosslinking treatment.

6. A method for producing a thermoplastic resin composition according to claim 1, comprising at least any one of the steps selected from the group consisting of:

a step of introducing all of (A) a thermoplastic polymer, (B) a softener for nonaromatic rubbers, (C) a metal hydrate, (D) an organic peroxide, (E) an antioxidant, (F) a coupling agent, and optional components to be used as desired into a melt kneader and melt kneading the mixture for 30 seconds or longer at a temperature higher than or equal to the 1 minute half-life temperature of said component (D) to obtain a thermoplastic resin composition;

a step of introducing all of said components (A) to (D), (F) and the optional components to be used as desired into a melt kneader and after the melt kneading temperature has reached a temperature higher than or equal to the 1 minute half-life temperature of said component (D), introducing said component (E) into the melt kneader to obtain a thermoplastic resin composition;

a step of firstly introducing all of said components (A) to (D), (F), and the optional components to be used as desired, and a part of said component (E) into a melt kneader and after the melt kneading temperature has reached a temperature higher than or equal to the 1 minute half-life temperature of said component (D), introducing the remainder of said component (E) into the melt kneader to obtain a thermoplastic resin composition; and a step of firstly introducing all of said component (D), and at least a part of said components (A) to (C), (F), and the optional components to be used as desired into a melt kneader, and after the melt kneading temperature has reached a temperature higher than or equal to the 1 minute half-life temperature of said component (D), introducing the remainder of said components (A) to (C), (F), and the optional components to be used as desired, and said component (E) into the melt kneader to obtain a thermoplastic resin composition.

7. A method for producing a wire, comprising:
(1) a step of obtaining a thermoplastic resin composition by the method according to claim 6;
(2) a step of melting the thermoplastic resin composition and extruding the thermoplastic resin composition around a conductor or a twisted product formed of several insulating coating conductors to form a wire using the thermoplastic resin composition obtained in said step (1); without
(3) a step of post-crosslinking treatment.

8. A wire comprising the thermoplastic resin composition according claim 2.

9. A method for producing the wire according to claim 4, comprising:
(1) a step of melt-kneading (A) a thermoplastic polymer, (B) a softener for nonaromatic rubbers, (C) a metal hydrate, (D) an organic peroxide, (E) an antioxidant, (F) a coupling agent, and optional components to be used as desired at a temperature higher than or equal to the 1 minute half-life temperature of said component (D) for 30 seconds or longer to obtain the thermoplastic resin composition; and
(2) a step of melting the thermoplastic resin composition and extruding the thermoplastic resin composition around a conductor or a twisted product formed of several insulating coating conductors to form a wire using the thermoplastic resin composition obtained in said step (1), without
(3) a step of post-crosslinking treatment.

10. A method for producing a thermoplastic resin composition according to claim 2, comprising at least any one of the steps selected from the group consisting of:

a step of introducing all of (A) a thermoplastic polymer, (B) a softener for nonaromatic rubbers, (C) a metal hydrate, (D) an organic peroxide, (E) an antioxidant, (F) a coupling agent, and optional components to be used as desired into a melt kneader and melt kneading the mixture for 30 seconds or longer at a temperature higher than or equal to the 1 minute half-life temperature of said component (D) to obtain a thermoplastic resin composition;

a step of introducing all of said components (A) to (D), (F) and the optional components to be used as desired into a melt kneader and after the melt kneading temperature has reached a temperature higher than or equal to the 1 minute half-life temperature of said component (D), introducing said component (E) into the melt kneader to obtain a thermoplastic resin composition;

a step of firstly introducing all of said components (A) to (D), (F), and the optional components to be used as desired, and a part of said component (E) into a melt kneader and after the melt kneading temperature has reached a temperature higher than or equal to the 1 minute half-life temperature of said component (D), introducing the remainder of said component (E) into the melt kneader to obtain a thermoplastic resin composition; and a step of firstly introducing all of said component (D), and at least a part of said components (A) to (C), (F), and the optional components to be used as desired into a melt kneader, and after the melt kneading temperature has reached a temperature higher than or equal to the 1 minute half-life temperature of said component (D), introducing the remainder of said components (A) to (C), (F), and the optional components to be used as desired, and said component (E) into the melt kneader to obtain a thermoplastic resin composition.

* * * * *